United States Patent Office 3,035,547
Patented May 22, 1962

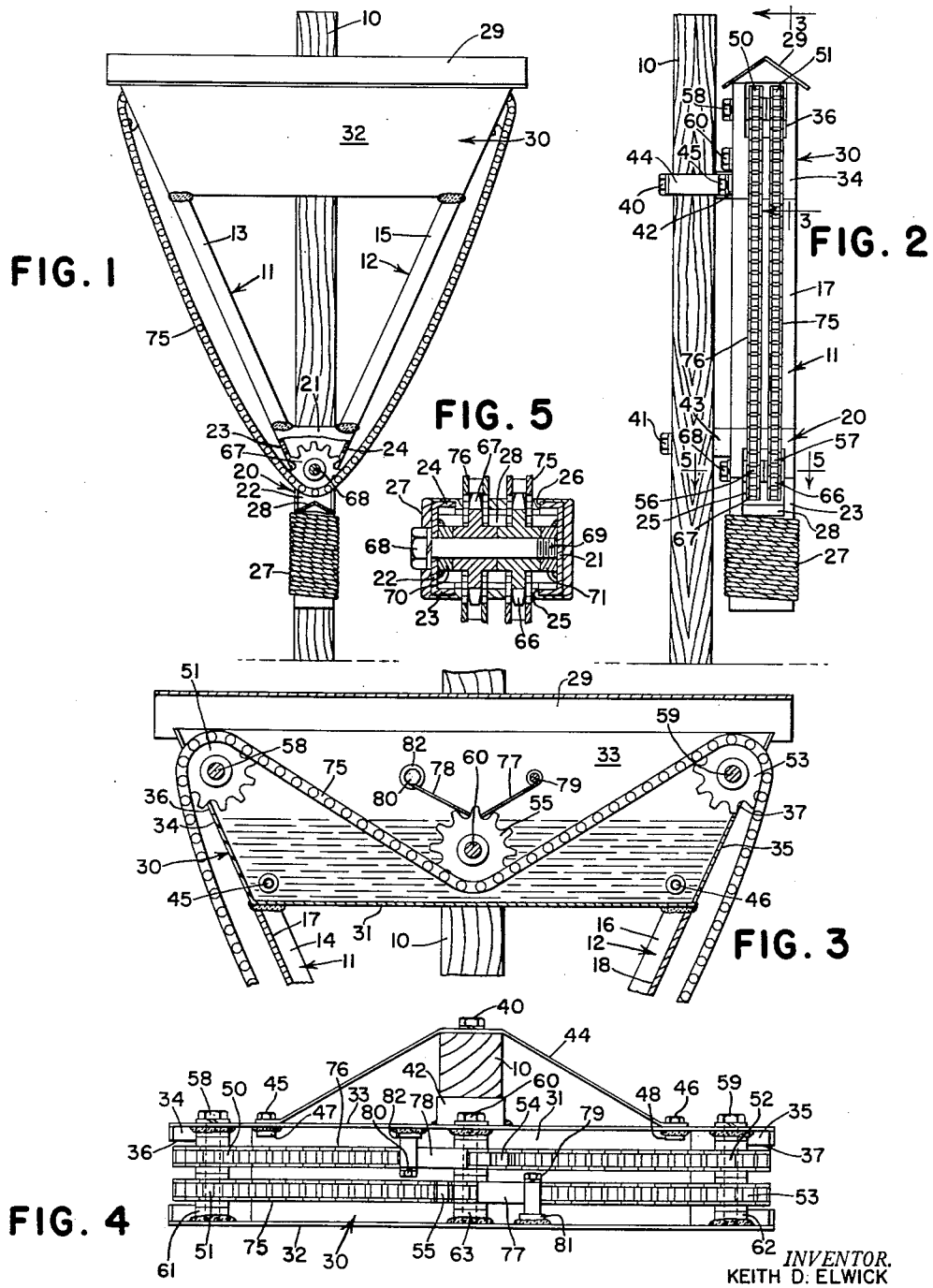

3,035,547
ANIMAL INSECTICIDE APPLICATOR
Keith D. Elwick, Vinton, Iowa, assignor to Hawk Bilt
Mfg. Corp., Vinton, Iowa, a corporation of Iowa
Filed Dec. 7, 1959, Ser. No. 857,587
14 Claims. (Cl. 119—157)

This invention relates to a device or mechanism for applying a treating fluid to the backs and sides of an animal. More particularly this invention relates to a mechanism of the above type in which the actual movement of the animal is utilized as the force to operate the mechanism.

Conventional among devices for applying liquid insecticide to the back or sides of animals is a liquid container having some type of discharge means which will normally pass the liquid or fluid to a fluid-transferring fabric or median which contacts the animal. It is not uncommon to utilize the movement of the animal against the fluid-transferring fabric or median to operate the discharge means on the device.

The one problem which is general with the conventional type of devices is the lack of provision of simple and adequate controls whereby the animal is insured a sufficient application of fluid and yet the fluid is not passed out of the container in wasteful or unnecessarily large quantities.

There have, of course, been several applicating devices in which valve controls have been incorporated in the mechanism. However, in most instances they have proved unsatisfactory both from a cost standpoint and an operational standpoint. They must operate during different seasons of the year. Consequently, they must adjust to or be adjusted to the varying viscosities of fluids due to the change in temperature. Also, the location of the average applicator is such that it constantly is in an environment of dust and dirt, which is normally such as to preclude the use of complicated yet relatively cheap valve mechanisms, since breakdowns and repair would constantly occur.

It is therefore the primary object of the present invention to provide structure utilizing a new and novel method of applying liquid to the back and/or side of an animal. It is proposed to provide such a structure which requires no valve mechanism for measuring the fluid as it leaves the liquid container.

As a main feature of the present invention, it is proposed to provide a continuous flexible element mounted over three ortary members which guide the flexible element for movement in a triangular shaped orbit disposed in a vertical plane with the apex of the triangle directed downwardly, and with two diverging side portions extending upwardly therefrom to a horizontal portion. Means are provided to guide the horizontal portion through the animal-treating liquid in a container. The inclined side portions are exposed, whereby the animal may rub against the side portions which will effect slight movement of the element and its rotary guide members in one direction. Lock means will prevent the element from moving in an opposite direction. Consequently, the fluid which remains on the flexible element as it passes through the liquid will find its way to the animal's back as it rubs against the inclined side portions of the element. There may, of course, be one or a series of parallel flexible elements and the associated guides if such are desired.

Other features to be disclosed as part of the present invention include a fluid permeable material positioned adjacent the apex portion of the flexible element for catching drippings from the element. The material, which will be positioned close to the ground, will then serve the purpose of providing a means of applying fluid to pigs or other relatively small animals.

Still other features and objects not yet enumerated will become apparent to those skilled in the art as the nature of the invention is fully understood from the following specification and as shown in the accompanying drawings.

FIGURE 1 is a front view of the fluid applying device with portions thereof broken away to expose interior mechanism.

FIGURE 2 is an end view of the applicator shown in FIGURE 1.

FIGURE 3 is an enlarged vertical sectional view taken along the line 3—3 of FIGURE 2.

FIGURE 4 is a plan view of the applicator with the hood or cover removed.

FIGURE 5 is a sectional view taken along the line 5—5 of FIGURE 2.

The fluid applying device is normally mounted on a post 10 which may be embedded in concrete in the earth, or may otherwise be fixed in the ground. It must, however, be solidly anchored to the ground.

The insecticide applicator includes an upright structure composed of a pair of inclined U-shaped channel members 11, 12 having inwardly turned flanges 13, 14, and 15, 16 respectively, the flanges 13, 14 and 15, 16 being integrally interconnected by bight portions 17, 18 respectively of the U-shaped channel members.

The lower ends of the channel members 11, 12 are rigidly interconnected by box-like plate structure, here indicated in its entirety by the reference numeral 20 comprising front and rear upright plates 21, 22 and side plates 23, 24, which have side openings shown at 25, 26. The box structure 20 flares outwardly to opposite sites at its upper end to conform to the angle of inclination of the channels 11, 12. The lower end is rectangular in cross section and has wrapped around it rope 27 or other fluid permeable material. A drip plate 28 is provided to guide dripping fluid to outer surfaces of the box structure 20 to eventually pass into the rope 27.

The upper diverged ends of the U-shaped channels 11, 12 forming the upright structure are welded to an elongated horizontally disposed fluid container 30 having a bottom 31, front and rear upright walls 32, 33 and end walls 34, 35 inclined at the angles of the bight portions 17, 18 respectively of the channels 11, 12. The end walls 34, 35 are provided with upwardly opening slots 36, 37 in their upper portions and, hence, as may be clearly evident from viewing FIGURES 2 and 3, the container 30 is fluid tight only in its lower half. A hood or cover 29 is provided on the container 30.

The container 30 and its upright frame is mounted on the post 10 by means of bolts 40, 41 at the upper and lower ends of the post respectively which extend through the post 10 and are received in suitable tapped openings provided in mounting pads 42, 43 respectively which are welded or otherwise fixed to the rear surfaces of the rear wall 33 and rear plate 22. Further provided to stabilize the mounting arrangement is a metal strap 44 which is bolted at 45, 46 at its opposite ends to the lower corners of the rear wall 33 and flares rearwardly therefrom behind the post 10 and is bolted thereto by the bolt 40. Boss portions 47, 48 are provided internally of the wall 33 to strengthen the connection of the bolts 45, 46.

Positioned at opposite ends of the container 30 and generally disposed in the upwardly opening slots 36, 37 are guide means comprising a first pair of rotary guide members or chain sprockets 50, 51 and a second pair of rotary guide members or chain sprockets 52, 53. The sprockets 50, 51, 52, 53 are mounted above the level of the fluid in the container 30. A third pair of guides or sprockets 54, 55 are mounted centrally in the container 30 and generally below the level of the fluid.

Mounted between the front and rear walls 21, 22 of the lower box structure is a fourth pair of guides or sprockets 56, 57. The pairs of sprockets 50, 51; 52, 53; and 54, 55 are mounted for free rotation on pivot bolts 58, 59, 60 respectively which extend through the rear wall 33 of the container and are threaded into tapped bosses 61, 62, 63 respectively welded to the internal face of the front wall 32.

A fourth pair of sprockets 66, 67 is provided adjacent the upper end of the lower box structure 20 and is mounted for free rotation on a pivot bolt 68. Referring now to FIGURE 5 to show the manner of mounting the sprockets 66, 67, the bolt 68 has its head end adjacent the rear surface of the rear plate 22 and extends through the plate 22 to terminate at a threaded end 69 adjacent the front plates 21. Welded to the inner faces of the front and rear plates 21, 22 are inwardly and axially alined embossments 70, 71, the latter being threaded to receive the threaded end 69 of the bolt 68. The sprockets 66, 67 are provided with hubs which fill out the axial length of the bolt 68 between embossments 70, 71 and therefore operate as spacers. The other sprockets 50—55 are mounted on their respective pivot pins or bolts in similar manner. Details of such mounting are therefore not considered necessary.

Front and rear continuous and flexible chain elements 75, 76 are mounted over the sprockets or guides 50—55 and under the sprockets or guides 66, 67 whereby the chains are disposed in vertical planes and are adapted to move in triangular shaped orbits with the apex of the triangles directed downwardly. The chains 75, 76 have horizontally disposed portions contained within the container 30 extending between sprockets 50, 51 and 52, 53. The sprockets 54, 55 operate to guide the horizontally disposed portions of chains 75, 76 adjacent thereto into the liquid contained in the container 30. The inclined side portions of the chains 75, 76 are exposed outside of the container 30 and receive backing support from the bight portions 17, 18 of the U-shaped channel members 11, 12.

Positioned above the sprockets 54, 55 are a pair of lock arms 77, 78 pivotally mounted on pivot pins or bolts 79, 80 respectively which are offset to opposite sides respectively of the sprockets 54, 55. The arms 77, 78 are mounted over the respective sprockets 55, 56 and each will normally be biased by its weight to engage the teeth of the respective sprocket. Therefore, as may be clearly seen by viewing FIGURES 3 and 4, the arm 77 will operate as a one-way stop or lock for the sprocket 55 and its chain 75 and the arm 78 will operate as a one-way stop or lock for the sprocket 54 and its chain 76. Consequently, each of the chains 75, 76 are permitted movement in only one direction and in an opposite direction from the other. The pivot bolts 79, 80 are secured in embossed sections 81, 82 on the internal surfaces of the container walls 32, 33 respectively. The chains 75, 76 are of conventional agricultural types which have their links pivotally interconnected on axes at right angles to the length of the chains.

In operation, the container is filled with an animal treating liquid of the type desired. The entire device is held above the ground at a level whereby cattle or other type of livestock may rub against the inclined portions of the chains 75, 76. Cattle will normally be attracted to the chains both for the scratching action they afford and for the soothing effect of the fluid. As the animals rub against one or both of the chains, the chains will be displaced slightly to one side or longitudinally, which will cause the chains to advance a tooth or so on the sprockets. Each of the chains is locked against advance in movement in one direction and opposite to the other chain. The chains 75, 76 will pick up fluid as they advance under the sprockets 54, 55. A thin film of fluid will remain on the chains as they advance to a point of contact with the back or side of the animal at which time the fluid will be transferred to the animal. Should some remain on the chains, it will form drops under the sprockets 66, 67 and will pass on the drop plate 28 to eventually permeate the rope 27. Small animals may then use the section of the structure containing the rope 27 as a rubbing post.

While only one form of the invention has been shown, it should be recognized that other forms and variations will occur to those skilled in the art without departing from the basic concept set forth. Therefore, it should be understood that while the present disclosure was presented in precise and detailed manner, such was for the purpose of fully explaining the operating features of the invention and it was not the intention to limit or narrow the invention beyond the broad concept set forth in the appended claims.

What is claimed is:

1. A device for applying treating fluid to an animal, comprising: an elongated horizontally disposed fluid container having longitudinally spaced ends; means supporting the container spacedly from the ground; upright structure depending from the container including a pair of oppositely disposed frame members converging from respective ends of the container to respective lower proximate ends; guide means supported on said container and on said upright structure adjacent said lower proximate ends; a pair of endless flexible rubbing elements mounted over the guide means, said guide means supporting and guiding the flexible elements through the fluid within the container whereby fluid will pass onto the flexible rubbing elements as they move through the fluid, and effecting oppositely disposed depending and inclined lengths on each element extending from opposite ends of the container to said lower proximate ends; and stop means permitting movement of said elements in only one direction and in opposite directions from one another.

2. A device for applying treating fluid to an animal, comprising: an elongated horizontally disposed fluid container having longitudinally spaced ends; means supporting the container spacedly from the ground; upright structure depending from the container including a pair of oppositely disposed frame members converging from respective ends of the container to respective lower proximate ends; rotary guide means supported on said container and on said upright structure adjacent said lower proximate ends; an endless flexible rubbing element mounted over the rotary guide means, and said rotary guide means supporting and guiding the flexible element through the fluid within the container whereby fluid will pass onto the flexible rubbing element as it moves through the fluid, and effecting oppositely disposed depending and inclined lengths of the element extending from opposite ends of the container to said lower proximate ends.

3. The invention defined in claim 2 in which the converging frame members are substantially solid members and are disposed inwardly of and adjacent the depending lengths of the flexible element to afford backing support for the flexible element.

4. The invention defined in claim 2 in which the flexible element is a chain and the guide means are sprockets, the chain being composed of links interconnected by pivot members at right angles to the length of chain.

5. The invention defined in claim 2 further characterized by a fluid-permeable material supported on the upright structure below the flexible element for receiving fluid from the flexible element adjacent the rotary guide means on said lower proximate ends.

6. The invention defined in claim 5 in which the lower proximate ends are rigidly interjoined and have depending structure extending downwardly therefrom and the fluid-permeable material is formed about the depending structure.

7. A device for applying treating fluid to an animal comprising: a substantially vertical support; a fluid container carried on said support adjacent the top thereof; first rotary guide and support means on said vertical support and a second guide and support means associated with said container; at least one endless flexible rubbing element mounted on said first and second guide and support means, and said rotary guide and support means guiding and supporting the flexible element through the fluid in the container whereby the fluid will pass onto the element as it moves through the container and effecting oppositely disposed depending lengths of the flexible element extending from the container to said first guide and support means on the support.

8. The invention defined in claim 7 further characterized by means restricting movement of the flexible element in one direction over the guide and support means.

9. The invention defined in claim 7 in which the guide and support means are mounted for rotation about axes substantially horizontal and parallel to one another and each of the guide and support means is adapted to support and guide a plurality of flexible elements disposed substantially parallel to one another on the guide and support means, and further characterized by a plurality of endless flexible elements supported and guided on the guide and support means.

10. The invention defined in claim 9 further characterized by means limiting movement of the endless elements in only one direction on the guide and support means and for at least one of the plurality of elements being capable of moving in an opposite direction from the other of the flexible elements.

11. The invention defined in claim 7 in which the container is elongated and said second guide and support means includes a guide and support member at each end of the container and one within the container at least partially submerged in the fluid whereby the flexible element will dip into the fluid as it moves on the latter guide and support member.

12. The invention defined in claim 11 in which the first support and guide means is beneath the container and laterally offset to at least one of the guide and support members on the ends of the container whereby a section of the endless flexible element extending from the former to the latter will be inclined to the horizontal.

13. The invention defined in claim 2 further characterized by stop means limiting movement of the flexible element in one direction.

14. The invention defined in claim 7 in which there is provided beneath the flexible element and on the frame stationary fluid permeable rubbing means positioned to receive fluid from the flexible element.

References Cited in the file of this patent

UNITED STATES PATENTS

| | | |
|---|---|---|
| 1,221,675 | Carson | Apr. 3, 1917 |
| 2,438,731 | Wedeking | Mar. 30, 1948 |
| 2,641,225 | Kirk | June 9, 1953 |